(12) United States Patent
Sun et al.

(10) Patent No.: US 11,896,927 B2
(45) Date of Patent: Feb. 13, 2024

(54) RADIAL ADSORBER WITH RADIAL CIRCULATION OF GAS

(71) Applicant: L'Air Liquide, Societe Anonyme pour l'Etude et l'Exploitation des Procedes Georges Claude, Paris (FR)

(72) Inventors: Lian-Ming Sun, Hangzhou (CN); Christophe Sobre, Champigny-sur-Marne (FR); Christian Monereau, Champigny-sur-Marne (FR); Vincent Gueret, Champigny-sur-Marne (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 155 days.

(21) Appl. No.: 17/683,555

(22) Filed: Mar. 1, 2022

(65) Prior Publication Data
US 2022/0280895 A1    Sep. 8, 2022

(30) Foreign Application Priority Data

Mar. 5, 2021  (FR) ................................. FR 2102138

(51) Int. Cl.
    *B01D 53/04* (2006.01)
    *B01D 53/047* (2006.01)
    *B01J 8/02* (2006.01)

(52) U.S. Cl.
    CPC ....... *B01D 53/0431* (2013.01); *B01D 53/047* (2013.01); *B01D 53/0438* (2013.01); *B01D 53/0462* (2013.01)

(58) Field of Classification Search
    CPC  B01D 53/04; B01D 53/0431; B01D 53/0438; B01D 53/0462; B01D 53/047;
    (Continued)

(56) References Cited

U.S. PATENT DOCUMENTS 4,637,266 A  *  1/1987  Greenwood ........... B01J 8/0214
                                                   502/45
5,015,383 A      5/1991  Evans et al.
(Continued)

FOREIGN PATENT DOCUMENTS

EP       0 402 783       12/1990
FR       3 033 264        9/2016
(Continued)

OTHER PUBLICATIONS

French Search Report for FR 2 102 138, dated Oct. 22, 2021.

*Primary Examiner* — Frank M Lawrence, Jr.
(74) *Attorney, Agent, or Firm* — Justin K. Murray

(57) ABSTRACT

A radial adsorber comprising: an adsorbent mass containing particles, a cylindrical shell ring extending along a longitudinal axis that is vertical when the adsorber is in operation, an external grid and an internal grid arranged in such a way as to be permeable to the gas and impermeable to the particles, the internal grid and external grid between them forming an annular volume housing the adsorbent mass, an internal chamber located between the vertical longitudinal axis and the internal grid, an external chamber located between the external grid and the shell ring, the internal chamber and external chamber being intended for the circulation of the gas, the external grid being formed by a plurality of wires and a plurality of supports, the supports being mounted transversely to the wires, the supports and the wires being mounted secured to one another.

11 Claims, 2 Drawing Sheets

(58) Field of Classification Search
CPC . B01D 53/0446; B01D 2259/40; B01J 8/0214
USPC .................................. 96/108, 121; 422/218
See application file for complete search history.

(56) References Cited

U.S. PATENT DOCUMENTS

| | | | | |
|---|---|---|---|---|
| 5,597,489 | A | * | 1/1997 | Schneider ................ B01J 45/00 |
| | | | | 210/688 |
| 5,759,242 | A | * | 6/1998 | Smolarek ........... B01D 53/0431 |
| | | | | 96/144 |
| 5,827,485 | A | | 10/1998 | Libal et al. |
| 2004/0134174 | A1 | | 7/2004 | Adhel-Hossein |
| 2008/0107575 | A1 | | 5/2008 | Vetter et al. |
| 2009/0154632 | A1 | * | 6/2009 | Naunheimer .......... B01D 53/08 |
| | | | | 376/210 |
| 2013/0269524 | A1 | * | 10/2013 | Monereau .......... B01D 53/0462 |
| | | | | 502/67 |
| 2020/0078722 | A1 | * | 3/2020 | Kiffer .................... B01J 8/0411 |

FOREIGN PATENT DOCUMENTS

| | | | |
|---|---|---|---|
| WO | WO 01/66239 | | 9/2001 |
| WO | WO 02/078833 | | 10/2002 |
| WO | WO 2008/073743 | * | 6/2008 |
| WO | WO 2013/192061 | | 12/2013 |

\* cited by examiner

RADIAL ADSORBER WITH RADIAL CIRCULATION OF GAS

CROSS REFERENCE TO RELATED APPLICATIONS

This application claims the benefit of priority under 35 U.S.C. § 119(a) and (b) to French patent application No. FR2102138, filed Mar. 5, 2021 the entire contents of which are incorporated herein by reference.

FIELD OF THE INVENTION

The present invention relates to a radial adsorber with radial circulation of gas and to a gas separation or purification unit comprising at least one such adsorber.

The invention may be applied particularly advantageously, although not exclusively, to PSA (Pressure Swing Adsorption) or LTSA (Low Temperature Swing Adsorption).

BACKGROUND OF THE INVENTION

Generally speaking, a gas phase adsorption process can be used to separate one or more molecules of a gas mixture containing said molecules, by utilizing the difference in affinity of one or more adsorbents for the various constituent molecules of the mixture. The affinity of an adsorbent for a molecule depends, on the one hand, on the structure and the composition of the adsorbent and, on the other hand, on the properties of the molecule, particularly its size, its electronic structure and its multipole moments.

An adsorbent can be, for example, a zeolite, an activated carbon, an optionally doped activated alumina, a silica gel, a carbon molecular sieve, an organometallic structure, an alkaline or alkaline-earth metal oxide or hydroxide, or a porous structure preferably containing a substance capable of reacting reversibly with the molecules that are to be captured (such a substance being, for example, an amine, a physical solvent, a metal complexing agent, a metal oxide or a metal hydroxide).

The more conventional adsorbent materials are in the form of particles (beads, rods, crushed materials, etc.), but they can also be found in structured form, such as monoliths, wheels, parallel passage contactors, fabrics, fibres, etc.

Although a radial adsorber is essentially used in the case of adsorbents in the form of small-sized particles (for example measuring from 0.5 to 5 mm), it is conceivable to use it also to support monoliths measuring a few centimetres, for example multi-perforated discs 2.5 cm in diameter and 1 cm in thickness or flat or curved strips a centimetre long and a millimetre thick, fabric, or fibres of lengths ranging from a few centimetres to several metres. The adsorbent material may be made up of several successive beds of different adsorbents or may be a homogenous mixture of several types of adsorbent. The term "adsorbent mass" refers to the material or to the mixture of materials employed in the adsorber.

Adsorption is widely used to purify or separate gases, and the processes employed in this domain can now be numbered in their tens. The adsorbent mass is, for the vast majority, kept immobile in a reactor which is more specifically designated as adsorber.

There are three main families of adsorption processes: sacrificial-charge processes, temperature swing adsorption processes referred to as TSA processes and lastly PSA processes.

In sacrificial-charge processes, a new charge is introduced when the existing charge is saturated with the impurities, or more generally when it is no longer able to provide adequate protection.

In TSA processes, the adsorbent, at the end of use, is regenerated in situ, that is to say that the impurities captured are discharged in order for said adsorbent to recover the greater part of its adsorption capabilities and to be able to recommence a purification cycle, the main regeneration effect being due to a rise in temperature. In the case of TSA processes, the temperature level to be used is essentially dependent on the affinity of the adsorbent for the impurity that is to be captured. When this affinity is high (a zeolite/water system for example) it may be necessary to use temperature levels exceeding 200° C. Conversely, when the affinity is low (activated alumina/CO2 for example), temperatures below 100° C. may be sufficient for impurity desorption. The term LTSA may thus be used to refer to TSA processes for which the usual regeneration temperature is not more than 100° C. higher, and preferably not more than 70° C. higher, than the adsorption temperature, for example if the regeneration temperature is limited to 100° C. with a feed at 30° C. These LTSA processes are being developed to make use of inexpensive energy (low-pressure steam, heat recuperated from fluids that are to be cooled).

In PSA processes, the adsorbent, at the end of the production phase, is regenerated by desorption of the impurities, which is achieved by means of a fall in their partial pressure. This pressure drop can be achieved by a drop in the total pressure and/or by flushing with a gas devoid of or with few impurities.

Pressure swing adsorption processes are used both to eliminate traces of impurities—for example, in levels below one percent in the feed gas—and to separate mixtures containing several tens of percent of different gases. The first case is generally referred to as purification (gas drying, for example) and the second case is generally referred to as separation (producing oxygen or nitrogen from atmospheric air, for example).

The term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, for which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is lower than atmospheric pressure, typically from 50 to 400 mbar abs;

MPSA or VPSA processes, in which the adsorption is carried out at a high pressure greater than atmospheric pressure, typically between 1.5 and 6 bar abs, and the desorption is carried out at a low pressure lower than atmospheric pressure, generally of between 200 and 600 mbar abs;

PSA processes proper, in which the high pressure is substantially greater than atmospheric pressure, typically between 3 and 50 bar abs, and the low pressure is substantially equal to or greater than atmospheric pressure, generally between 1 and 9 bar abs;

RPSA (Rapid PSA) processes, for which the duration of the pressure cycle is typically less than a minute;

URPSA (Ultra Rapid PSA) processes, for which the duration of the pressure cycle is of the order of a maximum of a few seconds.

It should be noted that these various designations (LTSA, VSA, VPSA, MPSA, RPSA, URPSA) are not standardized and that the limits are subject to variation. Unless advised to the contrary, it is recalled here that the use of the term PSA here covers all variants of PSA and that LTSA refers to any type of TSA in which the nominal regeneration temperature (which means to say the temperature outside of any regenerations performed under exceptional circumstances, such as upon initial commissioning or after an incident, etc.) is not more than 100° C. higher, and preferably not more than 70° C. higher, than the feed temperature.

The simplest adsorber is of cylindrical shape with their axis vertical. When the flows that are to be purified become substantial, it is possible to use clusters of adsorbers of this type operating in parallel and behaving like a single adsorber. Cylindrical adsorbers with their axis horizontal are also used.

With higher flow rates and/or if low pressure drops are sought and/or if the velocity of the gas may be higher than the attrition rate, which is to say the speed at which the particles move, it becomes advantageous to employ a radial adsorber.

This type of adsorber effectively has two parameters that can be modified at will, namely the diameter and the height of the grids, in order to define the cross section of the passage of gas through the adsorbent mass.

As is known, a radial adsorber comprises a vertical cylindrical shell ring with a central axis and lower and upper end caps. These end caps comprise a lower nozzle and an upper nozzle which are centred on the axis of the shell ring. The lower nozzle is used for supplying the adsorber with a gas that is to be treated and for collecting a waste. The upper nozzle is used for extracting the purified gas and for introducing for example a regeneration gas.

The gas that is to be treated circulates from the periphery towards the centre. Adsorption is therefore said to be of centripetal type.

The adsorbent mass is held in place between an outer perforated cylindrical grid and an inner perforated cylindrical grid. These grids are fixed at their lower ends to a domed solid internal end cap which maintains their separation and blocks off the particles of the adsorbent mass. The two grids are fixed at their other end to the upper end cap.

In practice, these grids are therefore suspended in the adsorber and free to move axially, but together because they are joined to one another by the internal end cap. The upper part of the grids consists of two solid (not perforated) cylindrical shell rings. The surplus of adsorbent housed in this upper zone is used at the same time to compensate for any potential compaction of the adsorbent mass over the course of time.

The homogenous distribution of the gases through the adsorbent mass is achieved by suitable sizing of the volumes left free for the gases and, in particular, by an external chamber positioned between the outer grid and the shell ring and an internal chamber at the centre of the adsorber. The free volumes of the adsorber which are occupied by the gases are generally referred to as "dead volumes" of the adsorber, as opposed to the volume occupied by the adsorbent.

At the end of the adsorption step, the feed gas and the gas produced which occupies these volumes are at least partially "sacrificed" because they leave with the waste. This effect needs to be taken into consideration when determining the performance of the unit employing such adsorbers, particularly in the case of the fastest (PSA) cycles.

In very general terms, the grids are made of perforated carbon steel or stainless steel sheet of 4 to 12 mm in thickness. In order to be industrially achievable, the dimension of the holes or, more generally, of the openings, needs to measure several millimetres or even several centimetres in the case of the thickest sheet metal, which means to say that such grids are incapable of holding back adsorbent particles of an average size generally of between 5 and 0.5 mm.

Such grids are therefore covered with an expanded metal or metal gauze, the through-openings of which may be of very small size (for example measuring a few hundred microns) while at the same time offering a high void ratio.

Other solutions for creating such grids have been described, such as a tight mesh of thick metal wires, gauze supported by a series of circular rings or by a coil or fixed to the end of solid separators of the shell.

More complex systems such as a honeycomb cylindrical framework made up of a stack of corrugated sheet metal rings with trapezoidal corrugations, or a grid with a framework wound into a helix in the manner of a flexible pipe or of a spring, the turns possibly being joined to one another by suitable flexible fasteners (grids of the hoop-net type) have also been proposed.

With the continuous development of adsorption processes for separating or purifying gases, there has been, on the one hand, an appreciable increase in the size of these adsorbers and, on the other hand, a far wider variety of operating conditions.

That being the case, the grids described above are not always capable of providing the best possible efficiency, and the technique via which they are manufactured is no longer suitable.

SUMMARY OF THE INVENTION

Certain embodiments of the present invention seeks to effectively overcome these disadvantages by providing a radial adsorber with radial circulation of gas, the radial adsorber comprising:
- an adsorbent mass containing particles,
- a cylindrical shell ring extending along a longitudinal axis A-A that is vertical when the adsorber is in operation, the shell ring comprising a lower end cap, an upper end cap, and gas inlet/outlet nozzles,
- an external grid arranged in such a way as to be permeable to the gas and impermeable to the particles, the external grid extending along the vertical longitudinal axis,
- an internal grid arranged in such a way as to be permeable to the gas and impermeable to the particles, the internal grid extending along the vertical longitudinal axis,
- sealing means for sealing the lower part and the upper part of the internal grid and external grid, the internal grid and external grid between them forming an annular volume housing the adsorbent mass,
- an internal chamber located between the vertical longitudinal axis and the internal grid,
- an external chamber located between the external grid and the shell ring, the internal chamber and external chamber being intended for the circulation of the gas,
- the external grid being formed by a plurality of wires and a plurality of supports, the supports being mounted transversely to the wires, the supports and the wires being mounted secured to one another, the wires forming a plurality of longitudinal openings for the passage of the gas such that two adjacent wires define one of the longitudinal openings of the plurality, each longitudinal opening having a minimum opening width Lo for the passage of the gas, each wire having, in cross section, a maximum wire width Lf measured in the direction in which the supports extend, the external grid being arranged in such a way that the supports extend along the vertical longitudinal axis, the external grid being arranged in such a way that the supports are positioned on the side of the external chamber and the wires on the side of the adsorbent mass.

Such an arrangement makes it easier for the gas to flow in the external chamber, the external grid thus creating channels extending in the direction of the vertical longitudinal axis. The wires are able to act as obstacles to the flow of the particles. The supports provide the mechanical integrity of the external grid.

According to one embodiment, the space between each wire is smaller than the space between each support.

According to one embodiment, the external grid is arranged in such a way as to satisfy the relationship $0.05 < Lo/(Lo+Lf) < 0.3$.

Such a ratio makes it possible to increase the local pressure drops of the external grid, which allows homogenous distribution of the gas as soon as the latter leaves the external chamber to enter the adsorbent mass.

According to one embodiment, the wires are rectangular in cross section.

According to one embodiment, the external grid is cylindrical, the external grid and the shell ring being concentric.

According to one embodiment, the internal grid is cylindrical, the internal grid and the shell ring being concentric.

According to one embodiment, the external chamber is annular. It thus allows the gas to flow right around the external grid without encountering any obstacle.

According to one embodiment, the external chamber defines an annular gas-distribution volume.

According to one embodiment, the external chamber is arranged in such a way that the gas can circulate over the entire periphery of the shell ring without encountering any obstacle. Such an arrangement of the external chamber and of the external grid facilitates the distribution of the gas on the outside of the external grid.

According to one embodiment, the external grid is arranged in such a way that the supports are positioned on the side of the external chamber, over the entirety of their length.

According to one embodiment, the external grid is arranged in such a way that the supports are positioned on the side of the external chamber, at each intersection with the wires.

According to one embodiment, the external grid is arranged in such a way that the wires are positioned on the side of the adsorbent mass, over the entirety of their length.

According to one embodiment, the external grid is arranged in such a way that the wires are positioned on the side of the adsorbent mass, at each intersection with the supports.

According to one embodiment, the external grid is arranged in such a way that, at each intersection between a wire and a support, just one side of the support is in contact with the wire, the intersection notably comprising means for securing the support and the wire to one another.

The use of such wires makes it possible to obtain an appreciable and very uniform pressure drop over the entire grid, the gas having to flow through a plurality of small identical channels which then act as a distribution splitter. The width of these channels is small enough to avoid small-sized particles being able to enter and pass through them.

According to one embodiment, the wires are of flared cross section and are mounted secured to the supports by their narrow end, the wide end being left free.

Such a geometry for the wires means that the pressure drop can be adapted if necessary by modifying the mean cross section for the passage of gas through the grid. In such an arrangement, the minimum width of the opening is on the adsorbent side. Thus, when its width is smaller than the diameter of the smallest of the particles, the particles are unable to enter the free volume that exists between the wires. It will be noted that, in any configuration in which this minimum cross section does not correspond to the internal diameter of the external grid, particles may enter the free volume that exists between the wires as far as this minimum cross section and locally and randomly obstruct the passage of the gas, which runs counter to the sought-after effect of achieving uniform distribution.

According to one embodiment, the wires are triangular or trapezoidal in cross section.

According to one embodiment, the external grid comprises a combination of wires of different cross sections.

Such an embodiment may make it possible to adapt the pressure drop imposed on the gas locally, for example in zones, so as to compensate for the variations in the velocity of this gas as it flows in the external distribution chamber. This principle may allow the distribution to be improved still further.

As a variant, each wire is of flared cross section, or each wire is rectangular in cross section.

According to one embodiment, the wires and the supports are made of metal and are secured to one another by welding, notably at each intersection between a wire and a support.

According to one embodiment, the supports are mounted perpendicular to the wires, the wires being mounted parallel to one another and the supports being mounted parallel to one another.

According to one embodiment, the internal grid is formed by a plurality of second wires and a plurality of second supports, the second supports being mounted transversely to the second wires, the second supports and the second wires being mounted secured to one another, the second wires forming a plurality of second longitudinal openings for the passage of the gas such that two adjacent wires define one of the longitudinal openings of the plurality, each second longitudinal opening having a minimum opening width Lo for the passage of the gas, each second wire having, in cross section, a maximum wire width Lf measured in the direction in which said supports extend.

According to one embodiment, the internal grid is arranged in such a way that the second supports extend along the vertical longitudinal axis.

According to one embodiment, the internal grid is arranged in such a way that the second supports are positioned on the side of the internal chamber and the wires on the side of the adsorbent mass.

According to one embodiment, the internal grid is arranged in such a way as to satisfy the relationship $0.05 < Lo/(Lo+Lf) < 0.3$.

The invention further relates to a gas separation or purification unit comprising at least one adsorber as described hereinabove, the unit employing a PSA or TSA process.

According to one embodiment, the unit is such that the difference in temperature between a feed stream and a heating stream for regeneration is less than 100° C., preferably less than 75° C. when the adsorber is in normal operation.

Such a unit, subjected to limited thermal stresses (expansion, contraction) allows for greater flexibility in the design of the grids, particularly the external grid.

According to one embodiment, the external grid has an external diameter greater than 2 m and a height greater than or equal to 3 m.

BRIEF DESCRIPTION OF THE DRAWINGS

The invention will be understood better from reading the following description and from studying the accompanying figures. These figures are given only by way of illustration and do not in any way limit the invention.

DETAILED DESCRIPTION OF THE INVENTION

Figure 1:
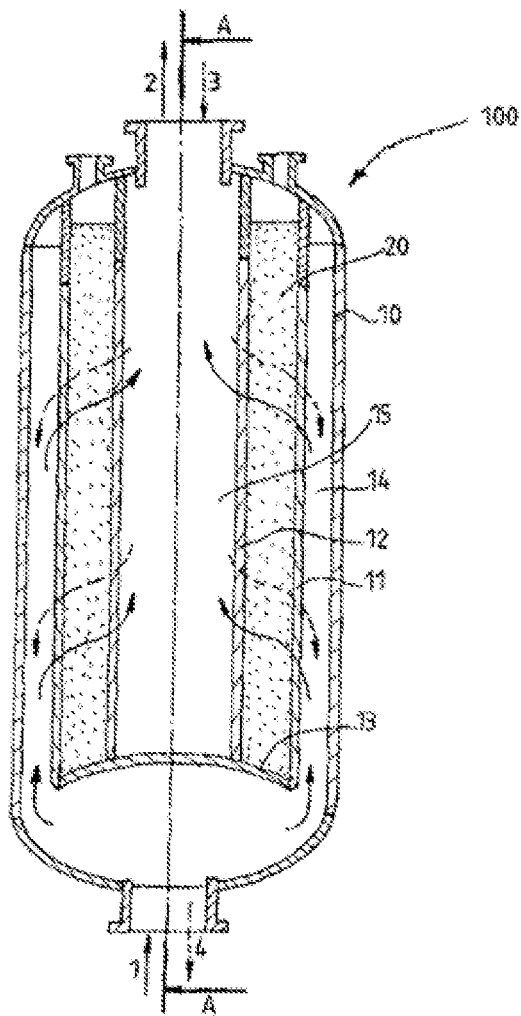
FIG. 1 is a schematic depiction of a radial adsorber according to the invention.

Reference is made to FIG. 1, which depicts an example of a radial adsorber 100 according to the invention. The radial adsorber 100 is intended for a unit that produces oxygen from atmospheric air. The cycle adopted is a VPSA cycle with 2 adsorbers 100, having a high pressure (at the end of adsorption) of 1.5 bar abs and a minimum low pressure of 0.47 bar obtained by pumping under vacuum. The cycle time is shorter than 40 s. The air inlet temperature is generally between 30 and 60° C. depending on the exterior temperature. This unit is capable of producing approximately 100 tonnes of oxygen at a molar percentage purity of 93%. This type of cycle and the way in which it is regulated means that it is possible to prioritize specific energy consumption over O2 production, or vice versa, by altering the various setpoints (pressures, step durations, etc.). Depending on the demand, the content of what is produced may also vary, usually from 89 to 94 mol % of oxygen.

The radial adsorber 100 here consists of a cylindrical shell ring 10 with longitudinal axis A-A that is vertical (when the adsorber is in operation) and two end caps, namely a lower end cap and an upper end cap. The cylindrical shell ring 10 further comprises gas inlet/outlet nozzles.

The adsorbent mass 20 contains particles. It is held in place by means of an external grid 11 and of an internal grid 12 which grids are fixed at one end to the upper end cap and at the other end to a domed internal end cap 13.

As a variant, the adsorber 100 may comprise two distinct beds (a first bed to capture almost all of the water and the vast majority of the CO2 and other secondary impurities such as hydrocarbons and at least one other bed for essentially performing the N2/O2 separation). For example, the adsorber may comprise a first bed of activated alumina followed by a second bed of lithium exchanged zeolite. In that case, the 2 annular beds are juxtaposed and separated by an intermediate grid. Compared with the example of FIG. 1, the assembly made up of the two juxtaposed beds and the intermediate grid would then take the place of the adsorbent mass 20, but the rest of the adsorber 100 would remain similar to that of FIG. 1.

The gas 1 that is to be purified or separated (and which is depicted by solid arrows) enters the lower part of the radial adsorber 100, circulates vertically at the periphery in an external chamber 14 between the cylindrical shell ring and the external grid 11, passes radially through the adsorbent mass 20, then circulates vertically in an internal chamber 15 before leaving the adsorber in the upper part, as a production gas 2.

During regeneration, the regeneration gas 3 (depicted by arrows drawn in dotted-line) enters countercurrently via the upper part, desorbs the impurities contained in the adsorbent mass 20 and the waste gas 4 leaves via the bottom part.

The cylindrical shell ring 10 has an external diameter Dv. The external grid 11 is cylindrical and has an external diameter De less than Dv. The internal grid 12 is cylindrical and has an external diameter Di less than De.

In the example of FIG. 1, Dv=2600 mm, De=2400 mm and Di=850 mm. The height of the internal grid 12 and the external grid 11 are heights equal to 6500 mm.

The external grid 11 and the internal grid 12 are designed to be permeable to the gas and impermeable to the particles of the adsorbent mass 20.

The adsorber 100 further comprises sealing means for sealing the lower part and the upper part of the internal grid 12 and external grid 11, the internal grid 12 and external grid 11 between them forming an annular volume housing the adsorbent mass 20.

In the example of FIG. 1, sealing at the upper part of the grids 11, 12 is performed by a flexible wall that is essentially horizontal and kept intimately pressed against the adsorbent mass 20 by a pressure effect. In practice, it is in this instance an essentially circular polymer membrane fixed to the upper part of the external grid 11.

Figure 2:
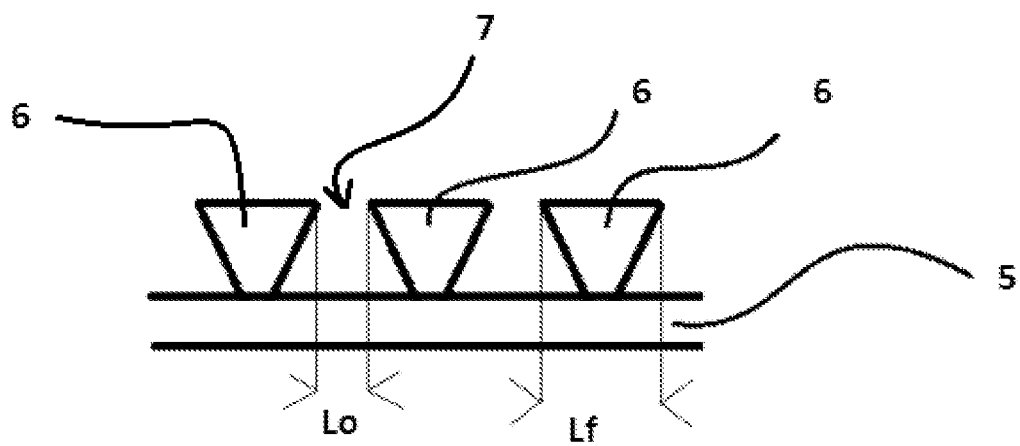
FIG. 2 is a schematic depiction of a portion of a grid of the adsorber of FIG. 1.

Reference is made to FIG. 2 which depicts a portion of the external grid 11 according to the invention.

In the example of FIG. 2, the external grid 11 is formed by a plurality of wires 6 and a plurality of supports 5, the supports 5 being mounted transversely to the wires 6, the supports 5 and the wires 6 being mounted secured to one another, the wires 6 forming a plurality of longitudinal openings 7 for the passage of the gas such that two adjacent wires 6 define one of the longitudinal openings 7 of the plurality, each longitudinal opening 7 having a minimum opening width Lo, each wire 6 having, in cross section, a maximum wire width Lf measured in the direction in which the supports 5 extend. This wire width Lf corresponds to the opposite side from the edge that is welded to the support 5.

In the example of FIG. 2, each wire 6 is of flared cross section and mounted secured to the supports 5 by its narrow end, the wide end being left free.

With these types of wire, the person skilled in the art used, however, to be encouraged to fix the wires 6 to the supports 5 in such a way that the narrow end was left free and the wide end was in contact with the supports 5.

With this geometry, the gas is immediately directed across the entire volume of the adsorbent mass 20, the wires 6 then acting as diffuser. In addition, since a proportion of the particles become lodged in the space between the wires 6, this results in a corresponding reduction in the external dead volume.

However, it has become apparent that this apparently favourable arrangement leads to passage restrictions that occur unpredictably according to the physical characteristics of the adsorbents (particularly the particle size distribution)

or the filling method. The particles of adsorbent find themselves trapped in the empty volume between two wires 6 at a depth that is dependent on their diameter, and this has the effect of creating more or less significant local obstructions. As the adsorbents have characteristics that differ slightly from one batch to another as a result of the manufacture, an obstruction may be formed for example at the time of the filling of the adsorber when a bag or a drum containing an above-average percentage of small-sized particles is tipped out. The extent of such a defect may then correspond to several percent of the surface area of the external grid 11 and may, in operation, have an impact that is unfavourable, or even unacceptable, depending on the applications.

As a variant, each wire 6 may be rectangular in cross section. As a further variant, the grid may comprise a mixture of these two types of wires 6 or, more generally, of wires 6 having different geometric characteristics.

The space between each wire 6 is also referred to as "slot" or "longitudinal opening". Each longitudinal opening has a width Lo. This opening determines the minimum cross section for the passage of the gas between the wires 6.

In the example considered, the wires 6 are welded to the supports 5 using electric welding.

The supports 5 may have a cross section with varying shapes (namely a circular, elliptical, square, rectangular, flared shape).

In the example depicted, the supports 5 are mounted perpendicular to the wires 6. The portion of the external grid 11 depicted in FIG. 2 shows just three wires 6 and one support 5.

The external grid 11 is arranged in such a way that the supports 5 are positioned on the outside of the annular volume and on the side of the external chamber 14.

The external grid 11 is arranged in such a way that the supports 5 are vertical when the adsorber is in operation (they therefore extend along the longitudinal axis).

Such a relative arrangement of the supports 5 ensures good distribution of the gas while at the same time minimizing the dead volume. Specifically, the gas is introduced into the adsorber 100 via one end of the peripheral free volume between the wall of the shell ring 10 and the external grid 11. This gas needs to be introduced as uniformly as possible along the entire periphery. It is therefore appropriate to facilitate the vertical circulation of this gas. A plurality of supports 5 arranged horizontally would generate a succession of obstacles creating a series of individual pressure drops (widenings, narrowings of the passage cross section) and of turbulence which would go against the sought-after effect of ensuring good distribution with a minimum of dead volume.

The external grid 11 is arranged in such a way as to satisfy the relationship $0.05<Lo/(Lo+Lf)<0.3$.

Such a ratio makes it possible to increase the pressure drops of the external grid 11, which allows homogenous distribution of the gas as soon as the latter leaves the external chamber 14 to enter the adsorbent mass 20.

Figure 3:
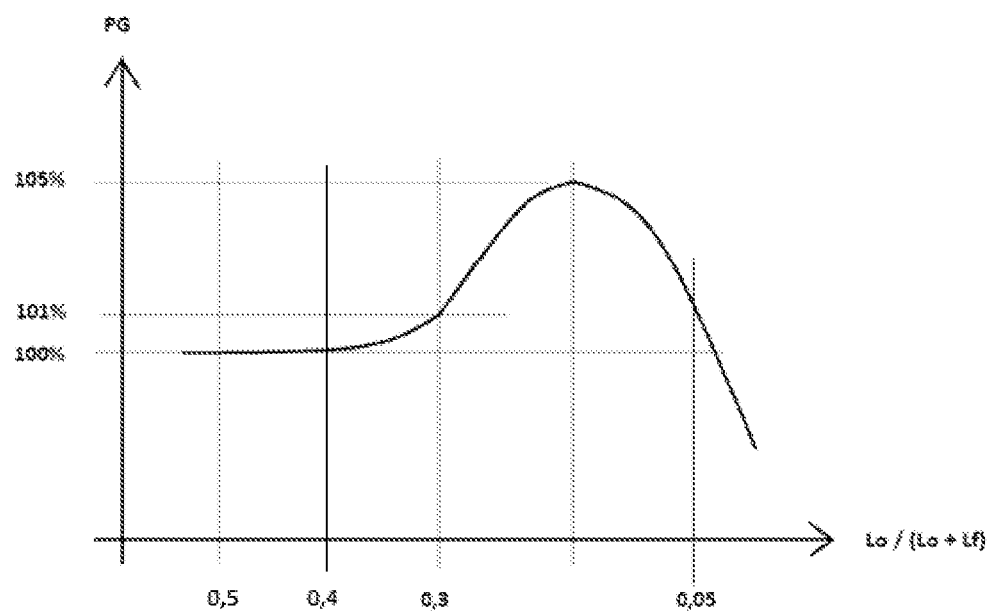
FIG. 3 is a depiction of how the overall performance of a unit employing the adsorber of FIG. 1 changes as a function of a parameter of the external grid of FIG. 2.

FIG. 3 depicts how the overall performance PG of a unit employing the adsorber of FIG. 1 changes as a function of the parameter $Lo/(Lo+Lf)$ of the external grid 11.

The overall performance PG of the unit encompasses everything that makes up the end cost of the product of the separation (raw material, energy, investment, etc.).

As can be seen in FIG. 3, when the ratio is higher than 0.3, the overall performance of the unit PG is 100%. As this ratio decreases towards the value of 0.3, the overall performance begins to be found to slightly exceed the value of 100% to reach 101% when the ratio is equal to 0.3.

The more the ratio drops (below 0.3), the more the overall performance increases to reach 105%. Having reached 105%, if the ratio continues to drop, then the overall performance begins to drop sharply until it is once again equal to 101% for a ratio of 0.05. Below this value, the overall performance returns to 100% to then drop below this value.

Thus, it may be noted that in the range of values 0.05-0.3, the overall performance is significantly improved by comparison with the reference value of 100%.

As visible in FIG. 3, for ratios from 0.5 to 0.4, the pressure drop created by the grid is still negligible, of the order of that of a conventional grid, and does not allow a reduction in the external dead volume. The overall performance obtained is therefore the same (100%) as in the case of a conventional grid.

By reducing this ratio, to around 0.3, the performance is improved (101%) thanks to the favourable effect on the dead volume while not yet having a penalizing effect on energy consumption. An optimum, of the order of 105%, is obtained when these two effects compensate for one another, namely when the incremental gain attributable to the reduction in the dead volume is completely counterbalanced by the incremental drop in energy, but the net effect remains beneficial so long as the ratio remains higher than around 0.05. Beyond that, the increase in pressure drop has a negative effect which may become highly unfavourable.

While the application of the principle behind the invention is applicable, generally speaking, to any radial adsorber, it has been possible to note that its key benefit is that of reducing the passage cross section allocated to the gas and therefore the diameter of the shell ring of the adsorber and the dead volumes. From this viewpoint, the benefit that can be expected from this will depend on the units. A first group that will benefit fully is that of PSA processes in general (PSA, VPSA, VSA and even more particularly RPSA and URPSA) for which the person skilled in the art is well aware that the dead volumes have a highly negative effect on performance.

A second group that will benefit greatly from this technology is that of units using large-sized radial adsorbers. For a grid 11, 12 of diameter equal to or greater than 2 m, and a height equal to or greater than 3 m, the benefit may become appreciable. This benefit will be the result of the reduction in the diameter of the shell ring 10 and of the lower and upper end caps. This is true without distinction of PSA units, TSA units or guard beds.

It will be noted that the invention relates to a radial adsorber but that the same type of analysis could be made on adsorbers of parallelepipedal shape, the use of which could be developed for processes at a pressure close to atmospheric pressure, such as the purification of air or lessening of CO2 content.

As used herein, means for sending a fluid is understood to include one or more conduits and the like that are configured to transfer fluids from one location to another location. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A radial adsorber configured for the radial circulation of gas, the radial adsorber comprising:
    an adsorbent mass containing particles;
    a cylindrical shell ring extending along a longitudinal axis A-A that is vertical when the adsorber is in operation, the shell ring comprising a lower end cap, an upper end cap, and gas inlet/outlet nozzles;
    an external grid arranged in such a way as to be permeable to the gas and impermeable to the particles, the external grid extending along the vertical longitudinal axis;
    an internal grid arranged in such a way as to be permeable to the gas and impermeable to the particles, the internal grid extending along the vertical longitudinal axis;
    sealing means for sealing the lower part and the upper part of the internal grid and external grid, the internal grid and external grid between them forming an annular volume housing the adsorbent mass;
    an internal chamber located between the vertical longitudinal axis and the internal grid;
    an external chamber located between the external grid and the shell ring, the internal chamber and external chamber being intended for the circulation of the gas;
    the external grid being formed by a plurality of wires and a plurality of supports, the supports being mounted transversely to the wires, the supports and the wires being mounted secured to one another, the wires forming a plurality of longitudinal openings for the passage of the gas such that two adjacent wires define one of the longitudinal openings of the plurality, each longitudinal opening having a minimum opening width Lo for the passage of the gas, each wire having, in cross section, a maximum wire width Lf measured in the direction in which the supports extend;
    the external grid being arranged in such a way that the supports extend along the vertical longitudinal axis; and
    the external grid being arranged in such a way that the supports are positioned on the side of the external chamber and the wires on the side of the adsorbent mass.

2. The radial adsorber according to claim 1, wherein the external grid is cylindrical, the external grid and the shell ring is concentric.

3. The radial adsorber according to claim 1, wherein the external chamber defines an annular gas-distribution volume.

4. The radial adsorber according to claim 1, wherein the external chamber is configured to allow circulation of the gas over an entire periphery of the shell ring without encountering any obstacle.

5. The radial adsorber according to claim 1, wherein the external grid is configured to satisfy the relationship $0.05 < Lo/(Lo+Lf) < 0.3$.

6. The radial adsorber according to claim 1, wherein each wire is of flared cross-section and mounted securely to the supports by a narrow end of each wire, a wide end of each wire being left free.

7. The radial adsorber according to claim 1, wherein the wires and the supports are made of metal and secured to one another by welding at each intersection between a wire and a support.

8. The radial adsorber according to claim 1, wherein the supports are mounted perpendicular to the wires, the wires being mounted parallel to one another and the supports being mounted parallel to one another.

9. A gas separation or purification unit comprising at least one radial adsorber according to claim 1, the unit employing a PSA or TSA process.

10. The gas separation or purification unit according to claim 1, wherein a difference in temperature between a feed stream and a heating stream for regeneration is less than 100° C. when the adsorber is in normal operation.

11. The gas separation or purification unit according to claim 1, wherein the external grid has an external diameter greater than 2 m and a height greater than or equal to 3 m.

* * * * *